United States Patent
Tsvi et al.

(10) Patent No.: US 8,473,941 B2
(45) Date of Patent: Jun. 25, 2013

(54) DYNAMIC FILE SYSTEM RESTRICTION FOR PORTABLE STORAGE DEVICES

(75) Inventors: Yaakov Ben Tsvi, Ramat Hasharon (IL); Judah Gamliel Hahn, Ofra (IL)

(73) Assignee: Sandisk IL Ltd., Kfar Saba (IL)

( * ) Notice: Subject to any disclaimer, the term of this patent is extended or adjusted under 35 U.S.C. 154(b) by 1039 days.

(21) Appl. No.: 12/169,305

(22) Filed: Jul. 8, 2008

(65) Prior Publication Data
US 2010/0011351 A1 Jan. 14, 2010

(51) Int. Cl.
*G06F 9/445* (2006.01)

(52) U.S. Cl.
USPC .......................................................... 717/174

(58) Field of Classification Search
USPC ................. 717/68–176; 713/1, 189
See application file for complete search history.

(56) References Cited

U.S. PATENT DOCUMENTS

| | | | |
|---|---|---|---|
| 5,404,494 A * | 4/1995 | Garney | 710/10 |
| 5,905,888 A * | 5/1999 | Jones et al. | 713/2 |
| 6,016,402 A * | 1/2000 | Thomas et al. | 710/8 |
| 6,266,811 B1 * | 7/2001 | Nabahi | 717/174 |
| 6,279,109 B1 * | 8/2001 | Brundridge | 713/2 |
| 6,915,420 B2 * | 7/2005 | Hensley | 713/2 |
| 6,993,649 B2 * | 1/2006 | Hensley | 713/2 |
| 7,373,656 B2 * | 5/2008 | Lang et al. | 726/3 |
| 7,712,086 B2 * | 5/2010 | Hughes et al. | 717/131 |
| 7,917,487 B2 * | 3/2011 | Hughes et al. | 707/706 |
| 8,001,367 B2 * | 8/2011 | Repasi et al. | 713/1 |
| 8,041,863 B2 * | 10/2011 | Kwan et al. | 710/72 |
| 8,423,682 B2 | 4/2013 | Datta et al. | |
| 2002/0078295 A1 * | 6/2002 | Shaath et al. | 711/112 |
| 2002/0085579 A1 * | 7/2002 | Sullivan et al. | 370/428 |
| 2003/0046447 A1 * | 3/2003 | Kouperchliak et al. | 709/321 |
| 2004/0172427 A1 * | 9/2004 | Thomas et al. | 707/204 |
| 2005/0050084 A1 * | 3/2005 | Atm | 707/102 |
| 2005/0083741 A1 * | 4/2005 | Chang et al. | 365/200 |
| 2005/0114300 A1 * | 5/2005 | Khalid et al. | 707/2 |
| 2005/0114643 A1 | 5/2005 | Bryant-Rich et al. | |
| 2006/0015431 A1 | 1/2006 | Bugaj et al. | |
| 2006/0026414 A1 * | 2/2006 | Firebaugh et al. | 713/1 |
| 2006/0075389 A1 * | 4/2006 | Itoh et al. | 717/126 |
| 2006/0130004 A1 | 6/2006 | Hughes et al. | |
| 2007/0086038 A1 * | 4/2007 | Matsuzaki | 358/1.13 |

(Continued)

FOREIGN PATENT DOCUMENTS

| | | |
|---|---|---|
| CN | 1991797 A | 7/2007 |
| KR | 671046 B1 * | 1/2007 |

OTHER PUBLICATIONS

International Search Report and Written Opinion for International Application No. PCT/US2009/049615. dated Sep. 3, 2009, 13 pages.

(Continued)

*Primary Examiner* — Don Wong
*Assistant Examiner* — Daxin Wu
(74) *Attorney, Agent, or Firm* — Toler Law Group, PC

(57) ABSTRACT

A method of installing an application on a portable storage device is disclosed. The method includes receiving file system commands issued by an installer application and selectively intercepting and modifying at least one file system command before the at least one file system command is executed with respect to a destination file system. The method restricts access to a first file system located at a fixed storage memory device and directs access to a second file system located on the portable storage device.

31 Claims, 5 Drawing Sheets

U.S. PATENT DOCUMENTS

| | | | |
|---|---|---|---|
| 2007/0150749 A1* | 6/2007 | Monaghan et al. | 713/189 |
| 2007/0156710 A1* | 7/2007 | Kern et al. | 707/100 |
| 2007/0234344 A1 | 10/2007 | Hamid et al. | |
| 2007/0260808 A1 | 11/2007 | Raines et al. | |
| 2008/0028146 A1 | 1/2008 | Dan et al. | |
| 2008/0147375 A1 | 6/2008 | Siren et al. | |

OTHER PUBLICATIONS

Mcree, R. "MojoPac: Get your MoJo working", ISSA Journal, May 2008, pp. 39-41, XP002542769, http://holisticinfosec.org/toolsmith/docs/may2008.pdf.

Trapani, G. "Geek to Live: Build your PC on a stick with MojoPac", Oct. 18, 2006, XP002542770, http://lifehacker.com/208338/geek-to-live--build-your-pc-on-a-stick-with-mojopac, 3 pages.

Burr, S. "Chroot-install—An aid to packaging" 2002, XP002542771, http://www.bpfh.net/computing/software/pkg-tools/man/chroot-install.1.htm, printed Aug. 25, 2009, 9 pages.

Pietrek, Matt. "Under the Hood", Microsoft Systems Journal, Feb. 1997, 10 pages, http://www.microsoft.com/msj/0297/hood/hood0297.aspx.

Office Action issued Feb. 16, 2013 in Chinese Application No. 200980123737 with English translation, 15 pages.

* cited by examiner

DYNAMIC FILE SYSTEM RESTRICTION FOR PORTABLE STORAGE DEVICES

FIELD OF THE DISCLOSURE

The present disclosure is generally related to installation of applications on portable storage devices.

BACKGROUND

Systems and methods of auto-launching computer applications from portable devices, such as universal serial bus (USB) flash memory devices that follow the U3 platform, have allowed for increased portability of personal computer software applications. Representative systems typically install computer executable content and configuration data onto the USB flash memory device or other type of removable storage device. However, application installers on a host computer typically are not aware of removable storage devices and may attempt to install applications by default to a fixed memory location, such as to a program file directory on a computer system fixed disk drive. The application installation process at the host computer complicates portable application installations to the removable storage device.

One previous approach to address this issue is to redirect a local environment such that variables that indicate the location of the program files directory instead point to a corresponding location on a removable storage device. This approach has limits since the approach only works if the install application is aware of the variables and uses the redirection method. Another approach is to virtualize the entire computer operating environment, but this approach can be expensive and may consume significant memory and CPU overhead. A further approach is to pre-package applications in a portable form, but such pre-packaging is not likely to be adopted by a majority of end users.

SUMMARY

Figure 1:
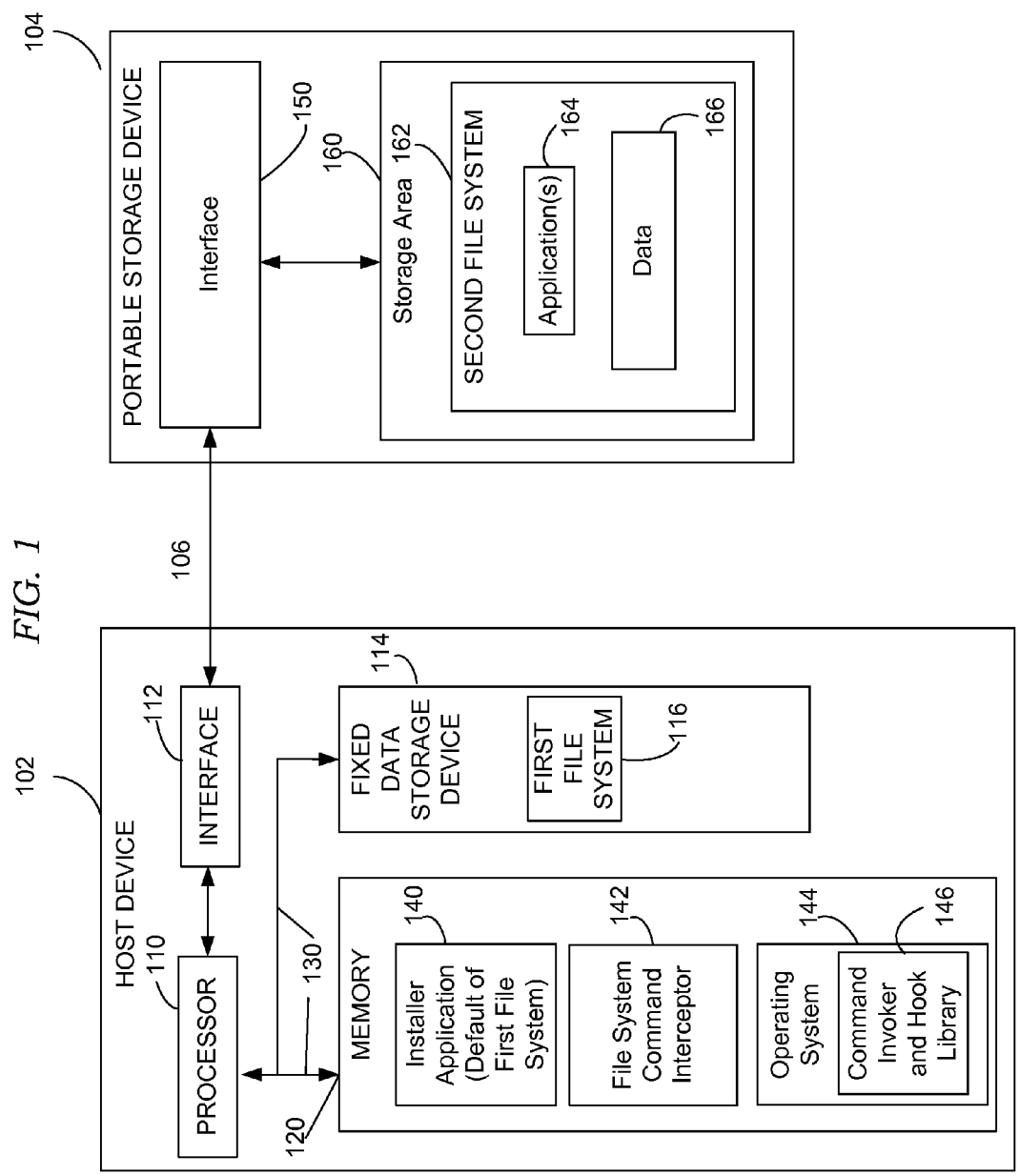
FIG. 1 is a block diagram of a particular embodiment of a system that includes a computer system and a portable storage device.

A system and method is disclosed that dynamically restricts the file systems available to an installer application at a host device, such as a host computer having an interface to a portable storage device. Based on heuristic patterns and rules, a monitor application can observe that an installer application is being executed and can restrict available file system selections to only allow for a file system at a selected device, such as a file system at the portable storage device. Thus, the installer application at the host device may only be allowed to install applications at the portable device. The heuristic patterns and rules may remove the restriction on available file systems in order to allow the installed application to function correctly when executed at the host device or to allow the installer application to access resources. The installer application resources may reside in a file system location that is different then the file system at the portable device.

In a particular embodiment, a method of installing an application onto a portable storage device is disclosed. The method includes receiving file system commands issued by an installer application at a host device that is coupled to a portable storage device. The method includes selectively intercepting and modifying at least one file system command before the at least one file system command is executed with respect to a destination file system. Access is directed to a second file system located on the portable storage device.

In another embodiment, a method is disclosed that includes receiving a request to install an application on a portable storage device coupled to a host device. The method also includes executing an installer program at the host device. The installer program issues a file system command to write one or more executable files for the application to a first file system at a first storage device. The method further includes intercepting the file system command and modifying the file system command to write the one or more executable files for the application to a second file system at the portable storage device.

In another embodiment, a portable data storage device is disclosed that includes an interface for connection to a host device and a storage area that includes a stored application installation redirection component. The application installation redirection component is configured to selectively modify parameters of at least one file system command during execution of an application installer program before the at least one file system command is executed by an operating system at the host device. The application installation redirection component selectively directs access to a second file system associated with the portable data storage device.

In another embodiment, a computer system is disclosed that includes a host system including an interface configured to communicate with a removable data storage device. The host system further includes a fixed data storage device. The host system is configured to selectively intercept and modify file system commands issued by an installer application before the file system commands are executed with respect to a target file system. The host system is further configured to selectively direct access to a second file system to enable the installer application to access the second file system.

DETAILED DESCRIPTION

Referring to FIG. 1, a particular embodiment of a system that includes a host device 102, such as a computer 102, and a portable storage device 104 is shown. In a particular embodiment, the host device 102 is a host computer system that includes a processor 110, an interface 112 to external devices, a memory 120, and at least one fixed data storage device 114. In a particular embodiment, the interface 112 is a universal serial bus (USB) interface. The host device 102 also includes a bus 130 to interconnect the processor 110, the memory 120, and the fixed data storage device 114. The fixed data storage device 114 may include one or more memory storage devices, such as hard disc drives, optical disc drives, tape readers, floppy disc drives, and other non-removable devices for reading or storing data. The host device 102 may include a variety of different electronic devices, such as a laptop computer, a personal digital assistant (PDA), an audio player, a cellular phone, or any other device that includes a processor that can access file system data or programs.

The memory 120 may include dynamic random access memory (RAM), read only memory (ROM), or other similar memory used to store processor executable instructions and data. The memory 120 includes an installer application (also referred to as an installer program) 140, file system command interceptor instructions 142, and operating system software 144. The installer application 140 has access to a default destination file system that is used for application installation. Typically, the default destination file system is a frequently used file system located at a main storage device, such as the representative first file system 116 located at the fixed data storage device 114. In a particular embodiment, the first file system 116 is a commonly used file system, such as the "C:" drive of a main disc drive used by the host device 102. While this particular embodiment uses terminology for a Microsoft® Windows® environment, other types of operating systems may be used.

The file system command interceptor instructions 142 have access to a file system path descriptor of a second file system 162. The second file system 162 is located on the portable storage device 104.

The operating system software 144 includes functionality to invoke file system commands and includes a hook library 146. The hook library 146 provides functionality so that file system commands issued by an application can be redirected or modified prior to execution.

The portable storage device 104 is a removable storage device that includes an interface 150 and a storage area 160. The storage area 160 includes a second file system 162 that may include applications 164. The applications 164 may be pre-loaded or the host device 102 may install new applications onto the portable storage device 104 by accessing the second file system 162. The second file system 162 also includes a data area 166. In an illustrative embodiment, the portable storage device 104 is a USB flash memory device. The USB flash memory device may comply with one or more industry standards for supporting portable applications. The USB flash memory device is a small device that is easily portable and that is removable from the host device 102. The USB flash memory device may be plugged into a USB socket, such as to interface 112 for connection to the host device 102 over a data communication path 106. Upon connection, the host device 102 can read data from or write data to the portable storage device 104.

During operation, upon connection of the portable storage device 104 to the interface 112 of the host device 102, the processor 110 may read data or instructions from or write data or instructions to the portable storage device 104. When the processor 110 initiates an action to install an application onto the portable storage device 104, the processor 110 executes instructions of the installer application 140. The installer application 140 has a default or initial setting for a destination file system to be used for application installation. The installer application 140 begins to install an application by initiating file system commands, such as commands to open a file, to write a file, or to copy a file at the default file system. Since the default file system is often the first file system 116 of the fixed data storage device 114, the installation process for portable applications can be complicated in this case. To overcome this issue, the file system command interceptor instructions 142 are executed by the processor 110 to selectively intercept and modify certain file system commands issued by the installer application 140.

The file system command interceptor instructions 142 implement logic to modify certain low level file system commands to redirect access from the first file system 116 to the second file system 162 located at the portable storage device 104. In a particular embodiment, the file system command interceptor instructions 142 are incorporated into the installer application 140. Alternatively, the file system interceptor instructions 142 may be executed to monitor the installer application 140 and are invoked upon execution of the installer application 140. Further, the file system command interceptor instructions 142 may utilize functionality of the command invoker and hook library 146 supported by the operating system 144. For example, the file system command interceptor instructions 142 may include application programming interface (API) hook logic to selectively intercept and modify certain file system API commands prior to the API commands being executed with respect to the destination file system. Examples of suitable API commands that may be intercepted and modified include a create file command, an open file command, and a copy file command. In this manner, an automated process is provided at the host device 102 to simplify installation of applications onto the portable storage device 104.

In a particular embodiment, the file system command interceptor instructions 142 are executable by the processor 110 to receive file system commands issued by the installer application 140 and to selectively intercept and modify parameters of the file system commands before the file system commands are executed with respect to a destination file system. The destination file system may be identified by a file system path name. The file system command interceptor instructions 142 are executed by the processor 110 to evaluate the file system path name and to restrict access to the first file system 116 and to direct access to the second file system 162. In this case, the installer application 140 has access to the second file system 162 but is blocked from access to the first file system 116.

Figure 2:
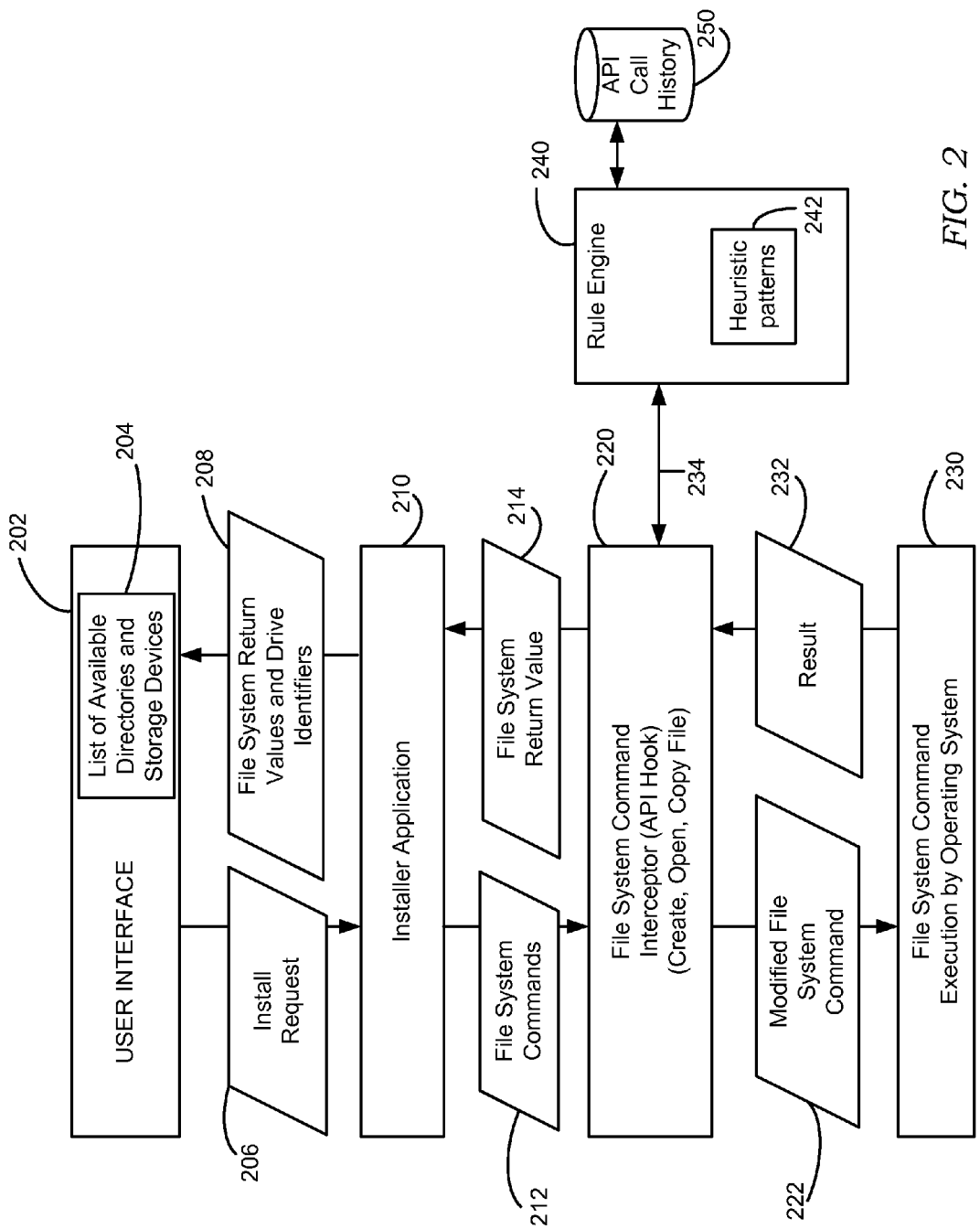
FIG. 2 is a block diagram that illustrates certain operations of the computer system of FIG. 1.

Referring to FIG. 2, certain operations of the host device 102 of FIG. 1 are illustrated in further detail. For example, FIG. 2 shows a user interface 202, an installer application 210, a file system command interceptor 220, and a file system command execution module 230. The file system command interceptor 220 has access to a rule engine 240. The rule engine 240 includes heuristic patterns 242 and is coupled to an API call history database 250.

Referring to FIG. 1 and FIG. 2, the installer application 210 refers to operations and logic performed by the processor 110 when executing the installer application 140, and the file system command interceptor 220 refers to operations and logic performed by the processor 110 when executing the file system command interceptor instructions 142. In addition, the rule engine 240 and the API call history database 250 can be implemented by the file system command interceptor instructions 142 or may be implemented as a separate component within the host device 102.

During operation, the user interface 202 may initiate application installation by sending an install request 206 to the installer application 210. The installer application 210 in turn sends one or more file system commands 212 to initiate installation of the designated application onto a storage device. The file system command interceptor 220 receives the file system commands 212 issued by the installer application 210. The file system interceptor 220 extracts information from the file system commands 212, such as a destination file system path name or a destination directory, and provides the extracted information to the rule engine 240 via a connector 234. The rule engine 240 evaluates the extracted information using a set of the heuristic patterns 242 and evaluates the extracted information with respect to previous API commands that are retrieved from an API call history database

250. The API call history database 250 stores at least one previously executed API command. The previously executed API command may be a command, such as an open file API command that the rule engine 240 can evaluate to identify execution of the installer application 210.

The rule engine 240 then makes a determination as to whether to intercept and modify one or more of the received file system commands 212. The rule engine 240 evaluates a set of rules with respect to the at least one previously executed API command and the rule engine 240 provides an output that determines whether the file system command interceptor 220 should selectively intercept and modify one or more of the file system commands 212. The set of rules may be used to determine whether to selectively intercept and modify parameters of the API commands before the API commands are executed by the operating system with respect to the destination file system.

The file system command interceptor 220 (also referred to as the API hook), selectively intercepts one or more of the file system commands 212 as determined by the rule engine 240 for an attempted application installation, and modifies parameters or other properties of the selected file system commands. The file system commands 212 may be selectively modified to redirect a destination file system from a default or initial file system (e.g., first file system 116 in FIG. 1) to a redirected file system (e.g., the second file system 162 that is located on the portable storage device 104 in FIG. 1).

Examples of file system commands include low level application programming interface (API) file system commands that may be called by the installer application 210. Such API file system commands include file create, open, and copy commands. Upon interception and modification of the file system commands, the file system command interceptor 220 generates a modified file system command 222 that is sent to the file system command execution logic of the operating system, as shown at 230. The file system command execution logic then executes the modified file system command 222 instead of the original file system command 212. In this manner, the file system commands are automatically intercepted and modified such that the installer application 210 receives access to a file system for the portable storage device but does not receive access to install files on a default file system, such as a fixed and non-removable storage device.

Examples of particular file system commands and illustrative modifications that can be made to those commands include a set of available file system restrictive actions, such as hiding a drive identifier associated with the first file system, removing a directory of the first file system from a list of user available directories, and preventing file access to the first file system during a copy operation.

For example, the file system command interceptor 220 can hide a drive identifier associated with the first file system, remove a directory of the first file system from a list of available directories, or prevent write access to the first file system during a copy operation. The drive identifier may be hidden by modifying a return value and parameters of the at least one file system command (e.g., a set drive type of command) when a monitored process identifies a particular destination directory or a translation of the particular destination directory. For example, the "C:" drive of the main disc drive of a host computer device may be hidden and only a drive identifier of the portable storage device would be shown to a user or to the installer application 210. As a further example, the directory may be removed from a list of available directories 204 by modifying an operating system find data command parameter of a find file command. The find file command may be an API command or a different type of command depending on the operating system environment. The find file command may be a find first file command or a find next file command. In another example, access to the first file system is prevented during a file system copy operation by intercepting a copy file system command and by changing a target directory of the copy file command, such that the target directory is located within the second file system at the portable storage device instead of within the first file system at a default storage device.

After execution of a file system command or the modified file system command 222, the file system command interceptor 220 receives a result 232 from the operating system 230. The file system command interceptor 220 may selectively intercept and modify the result 232 from the executed file system command to generate a file system return value 214. The file system return value 214 may provide a result that has been modified. For example, when the user interface 202 requests a list of available directories 204 or available file systems, the file system command interceptor 220 can intercept and modify the result 232 from this request such that file system return values and drive identifiers 208 returned to the user interface 202 do not include information for a first file system (e.g., the fixed storage device information), but instead provide the portable storage device file system information, as shown at 204.

Figure 3:
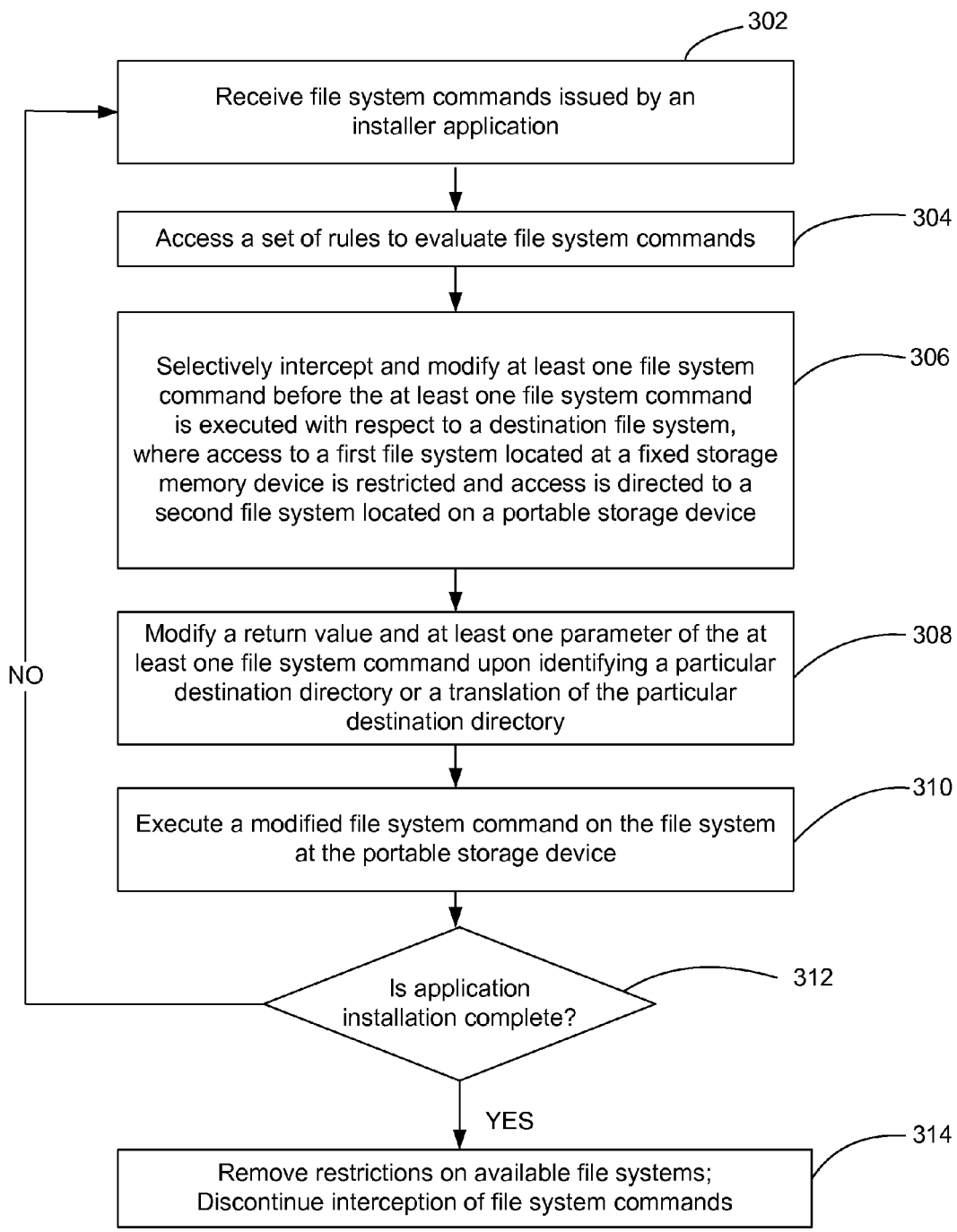
FIG. 3 is a flow diagram of a particular embodiment of a computer implemented method of processing file system commands related to installation of an application onto a portable storage device.

Referring to FIG. 3, a particular embodiment of a computer implemented method of processing file system commands related to installation of an application is illustrated. The method includes receiving file system commands issued by an installer application, at 302, and accessing a set of rules to evaluate the file system commands, at 304. The method includes selectively intercepting and modifying at least one file system command, such as by modifying a parameter of a file system command before the at least one file system command is executed with respect to a destination file system, at 306. The method is performed such that access to a first file system located at a fixed storage memory device is restricted and access is directed to a second file system located on a portable storage device instead of to the first file system.

In a particular embodiment, the method restricts access to the first file system by performing one or more redirection actions. For example, the method can hide a drive identifier associated with the first file system, remove a directory of the first file system from a list of available directories, or prevent write access to the first file system during a copy operation, as shown at 308. The drive identifier may be hidden by modifying a return value and parameters of the at least one file system command upon identifying a particular destination directory or a translation of the particular destination directory. For example, the "C:" drive of the main disc drive of a host computer may be hidden and only a drive identifier of the portable storage device would be shown to a user or to the installer application. As a further example, the directory may be removed from a list of available directories by modifying an operating system find file command. The find file command may be an API command or a different type of command depending on the operating system environment. In another example, access to the first file system is prevented during a file system copy operation by intercepting a copy file system command and by changing a target directory of the copy file command, such that the target directory is located within the second file system at the portable storage device instead of within the first file system at a default device.

The method further includes executing a modified file system command to access the file system at the portable storage device, at 310. For example, the application to be installed, or an image of multiple files to be loaded to the portable storage device, may be copied from the host device to the portable storage device to complete the application installation process.

After performing the file system command, an evaluation is conducted to determine whether application installation has completed, at 312. If the application installation process is completed, the method proceeds to remove restrictions on available file system operations and to discontinue file system command interception, as shown at 314. If the application installation process is not completed, then the method proceeds back at 302 to process further file system commands of the installer application. In a particular embodiment, the file system command interceptor is dependent on the application installer, such that the file system command interceptor does not intercept API calls made by other applications and automatically terminates when the installer exits.

Figure 4:
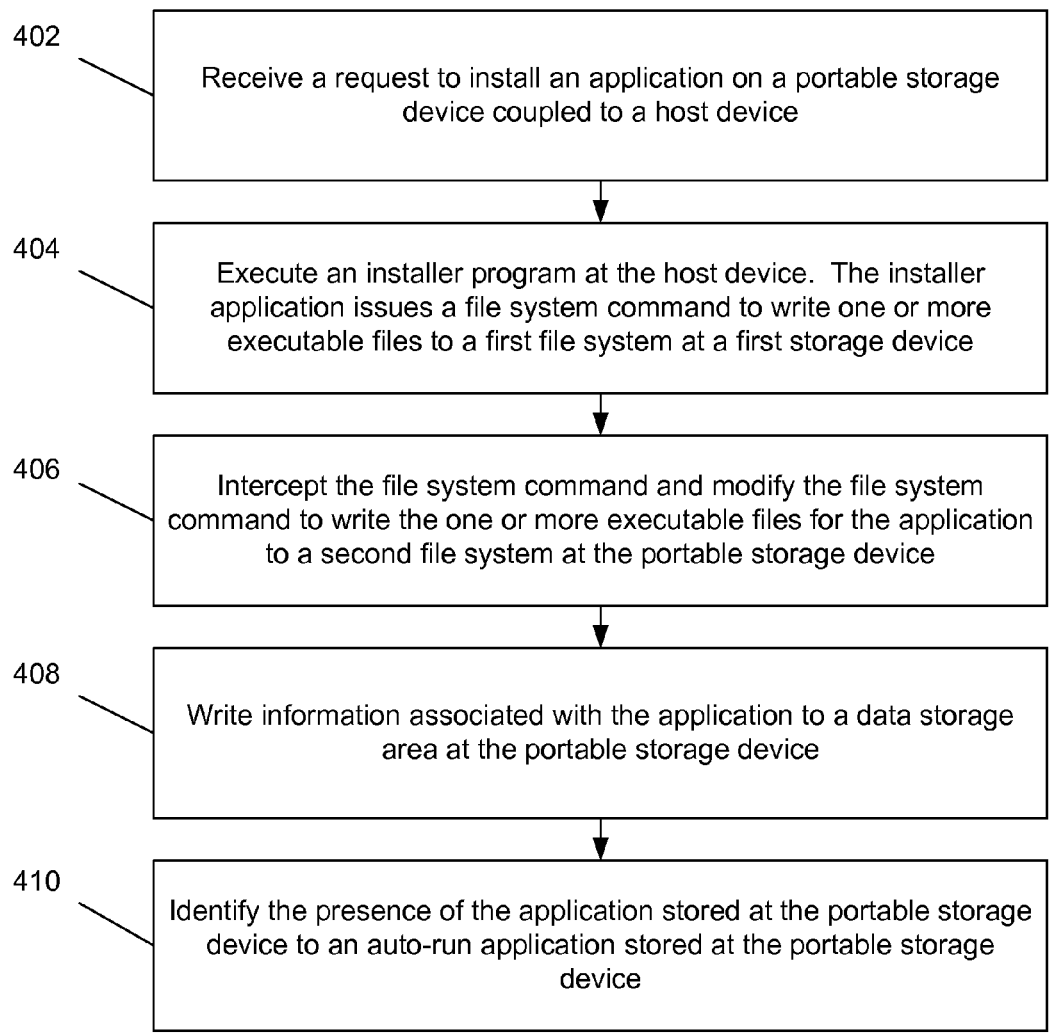
FIG. 4 is a flow diagram of a particular embodiment of a computer implemented method of installing an application onto a portable storage device.

Referring to FIG. 4, a particular embodiment of a computer implemented method of installing an application on a portable storage device is shown. The method includes receiving a request to install an application on a portable storage device coupled to a computer, at 402, and executing an installer program at the host computer device, at 404. The installer program issues one or more file system commands to write one or more executable files for the application to a first file system at a first storage device. For example, the installer application may attempt to issue file system commands to install at a default file system at a non-removable disc drive device of a host computer. The method includes intercepting the file system command (or multiple commands) and modifying the file system command to write the one or more executable files for the application to a second file system at the portable storage device, as shown at 406.

The method may further write information associated with the application to a data storage area at the portable storage device, as shown at 408. Also, the method may optionally identify a presence of the application stored at the portable storage device to an auto-run application stored at the portable storage device, as shown at 410. The auto-run application may be used to automatically bring up a user interface when the portable storage device is connected to an interface of a host device. The auto-run application may identify each of the applications that are stored on the portable storage device for ease of selection by the user. In a particular embodiment, the installed application is a portable application suitable for execution on other devices (e.g. a second or third computer) when the other device is coupled to the portable storage device. In a particular embodiment, portable applications and the usage of portable applications are implemented following the protocol and specifications of one or more industry standards for portable applications.

Figure 5:
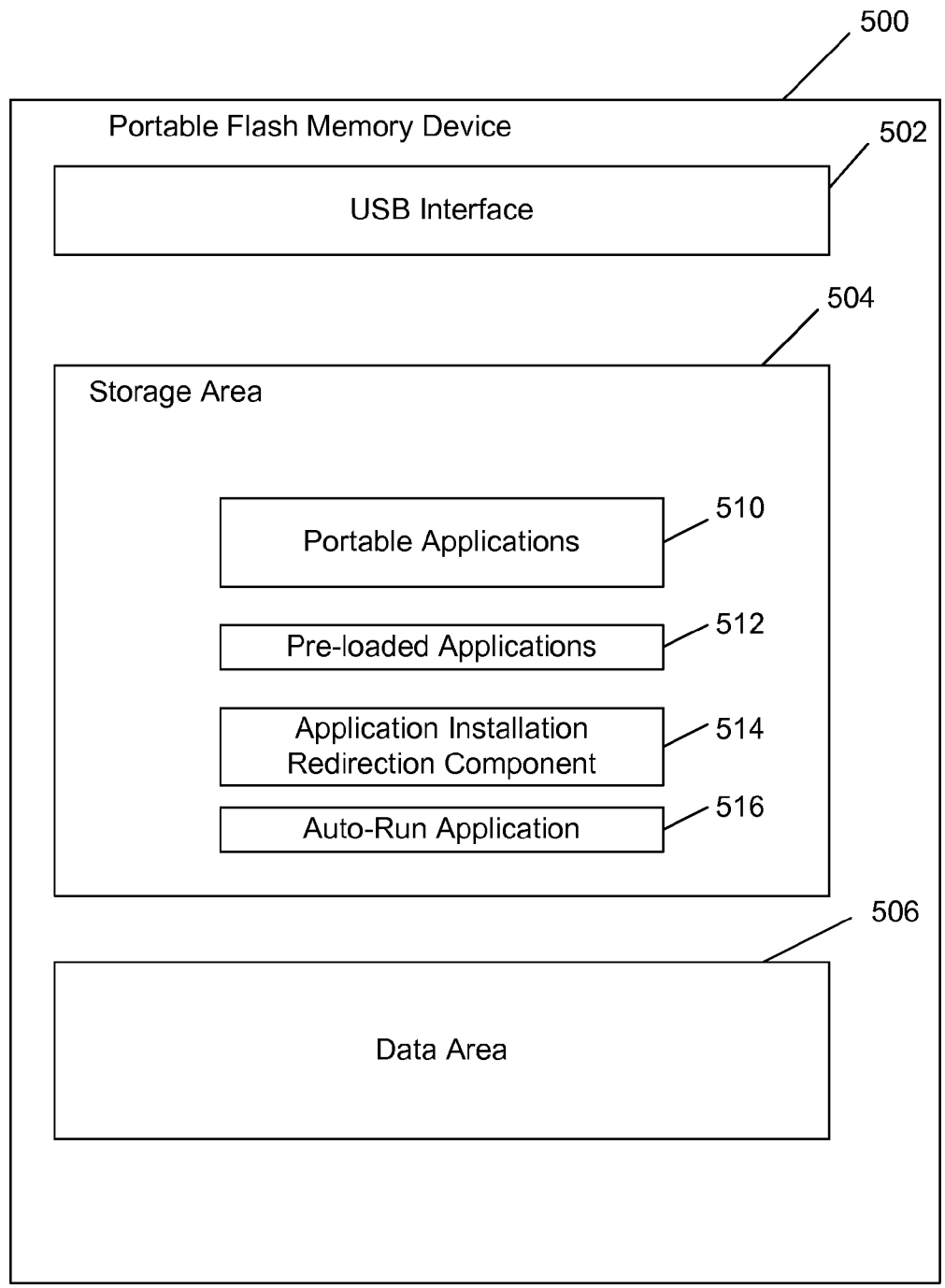
FIG. 5 is a block diagram of a particular embodiment of a portable storage device.

Referring to FIG. 5, a particular embodiment of a portable storage device is shown. The portable storage device 500 includes an interface 502, such as a universal serial bus (USB) interface, a storage area 504, and a data area 506. The storage area 504 may include installed portable applications 510, pre-loaded applications 512, an auto-run application 516, and an application installation redirection component 514. In a particular embodiment, the application installation redirection component 514 includes some or all of the file system command interceptor instructions 142 for execution by the host device 102, as depicted in FIG. 1.

During operation, upon connection of the portable storage device 500 to a host device, such as the representative host device 102 of FIG. 1, the host device may retrieve the application installation redirection component 514. For example, upon connection, the auto-run application 516 may automatically execute and may be programmed to load the application installation redirection component 514 from the portable storage device 500 to the host device for storage within a memory of the host device for subsequent execution in connection with the application installer program. Upon execution of the application installer program, the host device would also execute the application installation redirection program to intercept the appropriate file system commands, such as file system API commands, so that the application installer program has access to the portable storage device 500 for application installation. The application installation redirection component 514 includes instructions executable by a host device, during execution of an application installer program, to selectively intercept and modify parameters of at least one file system command before the at least one file system command is executed by an operating system with respect to a first file system associated with a storage device. The instructions are executed such that access to the first file system is selectively restricted and such that access is directed to a second file system associated with the portable data storage device 500.

Although FIG. 5 depicts loading the application installation redirection program from the portable storage device 500, in other embodiments, file system command interceptor instructions (e.g., 142 of FIG. 1 or 220 of FIG. 2) may be loaded onto the host device through alternative methods, such as by user direction, download, or installation from another media device.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description. Accordingly, the disclosure and the figures are to be regarded as illustrative rather than restrictive.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
at a host system that is operatively coupled to a portable storage device, performing:
receiving a plurality of file system commands issued by an installer application at the host system;
hiding a drive identifier associated with a first file system located at a fixed storage memory device of the host system;
removing a directory of the first file system from a list of available directories;
preventing write access to the first file system during a copy operation, wherein the plurality of file system commands includes a plurality of application programming interface (API) commands, wherein during installation of a portable application to the portable storage device, at least one of the plurality of API commands is selectively intercepted and modified such that the installer application has write access to a second file system but does not have write access to the first file system, and wherein a set of rules is used to determine whether to selectively intercept and modify parameters of the API commands before the API commands are executed with respect to a destination file system; and
selectively intercepting and modifying at least one file system command of the plurality of file system commands before the at least one file system command is executed with respect to the destination file system when the destination file system is the first file system, such that access is directed to the second file system located at the portable storage device.

2. The method of claim 1, wherein the portable storage device is a flash memory device having a universal serial bus (USB) interface.

3. The method of claim 1, wherein the directory is removed from the list of available directories by modifying an operating system parameter of a find file command.

4. The method of claim 1, wherein the write access to the first file system is prevented during the copy operation by intercepting a copy file command and by changing a target directory of the copy file command such that the target directory is located within the second file system instead of within the first file system.

5. The method of claim 1, wherein the at least one of the plurality of API commands is selected from a create file command, an open file command, and a copy file command and wherein the destination file system is identified by a file system path name.

6. The method of claim 5, wherein the drive identifier is hidden by modifying a return value and at least one parameter of the at least one file system command upon identifying a particular destination directory or a translation of the particular destination directory.

7. The method of claim 1, further comprising retrieving at least one previously executed API command from an API call history database and evaluating the set of rules based on the at least one previously executed API command.

8. The method of claim 7, wherein the at least one previously executed API command is a command to retrieve a file name from a user.

9. The method of claim 7, wherein the set of rules includes heuristic patterns.

10. The method of claim 9, wherein, based on the heuristic patterns and the set of rules, further comprising removing restrictions on access to available file systems in order to allow an installed application to function correctly when executed at the host system or to allow the installer application to access resources.

11. The method of claim 10, wherein the resources are accessed from the first file system.

12. The method of claim 1, further comprising executing the modified API command at an operating system program to perform a file system operation with respect to the second file system.

13. The method of claim 12, wherein the file system operation is a write command to perform an installation of the installer application onto the portable storage device.

14. A method comprising:
at a host system that is operatively coupled to a portable storage device, performing:
receiving a request to install an application on the portable storage device;
executing an installer program at the host system, the installer program issuing a file system command to write one or more executable files for the application to a first file system at a first storage device;
removing a directory of the first file system from a list of available directories;
preventing write access to the first file system during a copy operation, wherein the file system command includes an application programming interface (API) command, wherein during installation of a portable application to the portable storage device, the API command is selectively intercepted and modified such that the installer application has write access to a second file system but does not have write access to the first file system, and wherein a set of rules is used to determine whether to selectively intercept and modify parameters of the API command before the API command is executed with respect to a destination file system; and
intercepting the file system command and modifying the file system command to write the one or more executable files for the application to the second file system at the portable storage device.

15. The method of claim 14, further comprising writing information associated with the application to a data storage area at the portable storage device.

16. The method of claim 14, further comprising identifying the presence of the application stored at the portable storage device to an auto-run application stored at the portable storage device.

17. The method of claim 14, wherein the application is a portable application suitable for execution on a second host device when the second host device is coupled to the portable storage device.

18. The method of claim 14, wherein the first file system is a default file system identified by the host system and wherein the first storage device is a disk drive attached to the host system.

19. The method of claim 14, wherein the portable storage device comprises a universal serial bus (USB) flash memory device, and wherein the host system comprises a computer.

20. A host system comprising:
an interface configured to communicate with a removable data storage device;

an installer application configured to issue a plurality of file system commands;

a fixed data storage device; and a processor, wherein, with the processor, the host system is configured to selectively intercept and modify parameters of a file system command of the plurality of file system commands issued by the installer application before the file system command is executed with respect to a target file system on the fixed data storage device;

wherein the host system is further configured to selectively remove a directory of a first file system from a list of available directories located on the fixed data storage device;

wherein the host system is further configured to selectively direct access to a second file system to enable the installer application to access the second file system; and wherein the host system is further configured to prevent write access to the first file system during a copy operation, wherein the plurality of file system commands includes a plurality of application programming interface (API) commands, wherein during installation of a portable application to the removable data storage device, at least one of the plurality of API commands is selectively intercepted and modified such that the installer application has write access to the second file system but does not have write access to the first file system, and wherein a set of rules is used to determine whether to selectively intercept and modify parameters of the API commands before the API commands are executed with respect to a destination file system.

21. The host system of claim 20, wherein the target file system is identified by a target file system path name.

22. The host system of claim 21, wherein the host system is further configured to evaluate the target file system path name.

23. The host system of claim 20, wherein the fixed data storage device is a flash memory, and wherein the interface is a universal serial bus (USB) interface.

24. The host system of claim 20, wherein the API commands are selected from a create file command, an open file command, a copy file command, a directory content enumeration command, and a drive enumeration command.

25. The host system of claim 20, wherein the host system is configured to perform a set of file system restrictive actions including hiding a drive identifier associated with the first file system.

26. The host system of claim 25, wherein the drive identifier is hidden by modifying a return value and parameters of the file system command when the file system command includes a destination directory or a translation of the destination directory.

27. The host system of claim 26, wherein the file system command is a find file command and wherein a directory is removed from a list of user available directories by modifying a parameter of the find file command.

28. The host system of claim 26, wherein the file system command is a copy file command and wherein access to the first file system is prevented during the copy operation by changing a target directory of the copy file command such that the target directory is located within the second file system instead of the first file system.

29. The host system of claim 23, further comprising an API call history database that stores at least one previously executed API command and further comprising a rule engine to evaluate a set of rules, wherein the rule engine evaluates the set of rules with respect to the at least one previously executed API command and wherein the rule engine provides an output that determines whether to selectively intercept and modify the API commands.

30. A portable data storage device comprising:

an interface for connection to a host device;

a storage area that includes a stored application installation redirection component, the application installation redirection component configured to:

selectively modify parameters of at least one file system command during execution of an application installer before the at least one file system command is executed by an operating system;

selectively direct access to a second file system associated with the portable data storage device;

remove a directory of a first file system from a list of available directories, wherein the first file system is located at a fixed storage memory device of the host device; and prevent write access to the first file system in a copy operation, wherein the at least one file system command is an application programming interface (API) command, wherein during installation of a portable application to the portable storage device, the API command is selectively intercepted and modified such that the installer application has write access to the second file system but does not have write access to the first file system, and wherein a set of rules is used to determine whether to selectively intercept and modify parameters of the API command before the API command is executed with respect to a destination file system.

31. The portable data storage device of claim 30; wherein the application installation redirection component is configured to hide a drive identifier associated with the first file system and to prevent write access to the first file system during a copy operation.

* * * * *

UNITED STATES PATENT AND TRADEMARK OFFICE
CERTIFICATE OF CORRECTION

PATENT NO.        : 8,473,941 B2
APPLICATION NO.   : 12/169305
DATED             : June 25, 2013
INVENTOR(S)       : Yaakov Ben Tsvi et al.

Page 1 of 1

It is certified that error appears in the above-identified patent and that said Letters Patent is hereby corrected as shown below:

In the Claims

Column 12, Claim 30, Line 34, "prevent write access to the first file system in a copy" should read --prevent write access to the first file system during a copy--.

Column 12, Claim 31, Line 47, "The portable data storage device of claim 30; wherein" should read --The portable data storage device of claim 30, wherein--.

Signed and Sealed this
Twelfth Day of August, 2014

Michelle K. Lee
*Deputy Director of the United States Patent and Trademark Office*